United States Patent
Quinn et al.

(10) Patent No.: US 11,716,378 B2
(45) Date of Patent: Aug. 1, 2023

(54) OPTIMIZED NETWORK DEVICE QUEUE MANAGEMENT FOR HYBRID CLOUD NETWORKING WORKLOADS

(71) Applicant: Red Hat, inc., Raleigh, NC (US)

(72) Inventors: Yanir Quinn, Tel Aviv (IL); Marcel Apfelbaum, Raanana (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/488,129

(22) Filed: Sep. 28, 2021

(65) Prior Publication Data

US 2023/0093884 A1    Mar. 30, 2023

(51) Int. Cl.
*G06F 15/16*      (2006.01)
*H04L 67/1001*    (2022.01)

(52) U.S. Cl.
CPC .............................. *H04L 67/1001* (2022.05)

(58) Field of Classification Search
CPC ........... H04L 67/1002; H04L 29/08144; H04L 29/06
See application file for complete search history.

(56) References Cited

U.S. PATENT DOCUMENTS

| | | | |
|---|---|---|---|
| 9,262,198 B2 | 2/2016 | Zheng et al. | |
| 9,584,597 B2 | 2/2017 | James et al. | |
| 10,754,686 B2 | 8/2020 | Guo et al. | |
| 11,016,798 B2 | 5/2021 | Gopalan | |
| 2011/0179132 A1 | 7/2011 | Mayo et al. | |
| 2012/0110651 A1* | 5/2012 | Van Biljon | G06Q 30/04 726/4 |
| 2012/0284408 A1* | 11/2012 | Dutta | H04L 67/1002 709/226 |
| 2012/0304179 A1* | 11/2012 | Devarakonda | G06F 9/5072 718/102 |
| 2012/0324114 A1* | 12/2012 | Dutta | H04L 29/08144 709/226 |
| 2013/0151680 A1* | 6/2013 | Salinas | G06F 16/211 709/223 |
| 2013/0191527 A1* | 7/2013 | Ashok | G06F 9/5072 709/224 |
| 2014/0137182 A1* | 5/2014 | Elzur | H04L 29/06 726/1 |

(Continued)

OTHER PUBLICATIONS

Philip Brownlow et al., "CPU Management—CPU Pinning and Isolation in Kubernetes* Technology Guide," Jan. 2021, 24 pgs.

(Continued)

*Primary Examiner* — Razu A Miah
(74) *Attorney, Agent, or Firm* — Lowenstein Sandler LLP

(57) ABSTRACT

A network device queue manager receives a request to execute a workload on a node of a cloud computing environment, where the cloud computing environment comprises a plurality of nodes; determines that the workload is to be executed by a dedicated processor resource; identifies a set of one or more shared processor resources associated with the node, wherein each shared processor resource of the set of shared processor resources processes device interrupts; selects a processor resource from the set of one or more shared processor resources to execute the first workload on the first node; bans the selected processor resource from processing device interrupts while executing the workload; and executes the workload with the selected processor resource.

14 Claims, 7 Drawing Sheets

(56) References Cited

U.S. PATENT DOCUMENTS

| | | | | |
|---|---|---|---|---|
| 2014/0372595 A1* | 12/2014 | Ashok | ................. | H04L 41/0853 |
| | | | | 709/224 |
| 2016/0205181 A1* | 7/2016 | James | ................... | G06F 9/5088 |
| | | | | 709/226 |
| 2017/0192808 A1* | 7/2017 | Kaufer | ................ | G06F 9/45558 |
| 2017/0286257 A1 | 10/2017 | Etelson et al. | | |
| 2017/0286332 A1 | 10/2017 | Kotary et al. | | |
| 2018/0101486 A1* | 4/2018 | Lu | ......................... | G06F 9/4812 |
| 2021/0064429 A1 | 3/2021 | Stetter, Jr. et al. | | |

OTHER PUBLICATIONS

VMware, "Best Practices for Performance Tuning of Latency-Sensitive Workloads in vSphere VMs," 2013, 10 pgs.

Extended European Search Report Serial No. EP 21 20 9169 dated May 17, 2022, 9 pages.

\* cited by examiner

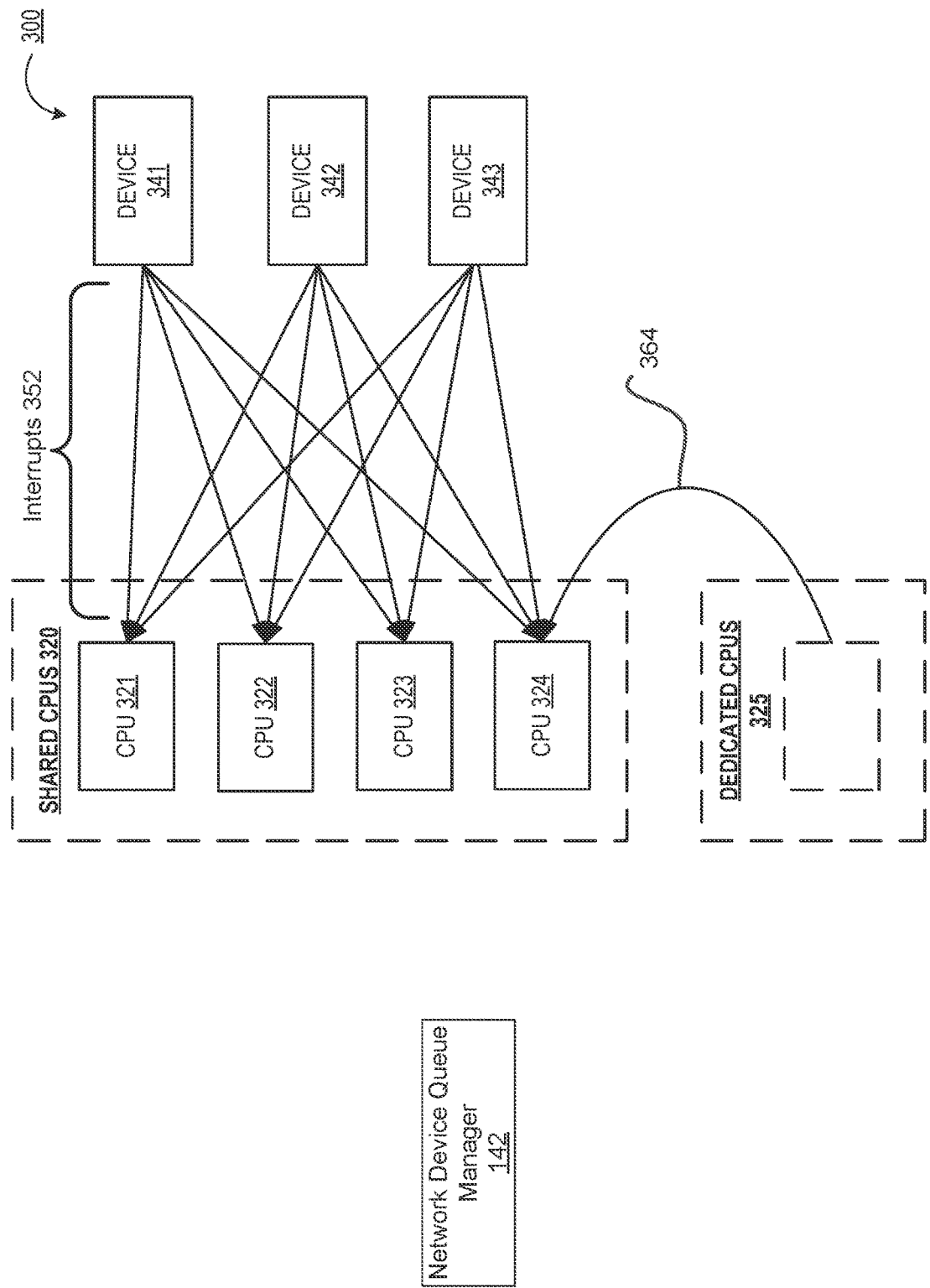

OPTIMIZED NETWORK DEVICE QUEUE MANAGEMENT FOR HYBRID CLOUD NETWORKING WORKLOADS

TECHNICAL FIELD

The present disclosure is generally related to computer systems, and more particularly, to optimizing network device queue management for workloads in cloud computing systems.

BACKGROUND

Platform-as-a-Service (PaaS) system offerings can include software and/or hardware facilities for facilitating the execution of applications (web applications, mobile applications, etc.) in a cloud computing environment (the "cloud"). Cloud computing is a computing paradigm in which a user engages a "cloud provider" to execute a program on computer hardware owned and/or controlled by the cloud provider. A cloud provider can make virtual machines (VMs) hosted on its computer hardware available to customers for this purpose. The cloud provider can provide an interface that a user can use to requisition virtual machines and associated resources such as security policies, processors, storage, and network services, etc., as well as an interface to install and execute the user's applications and files on the virtual machines.

PaaS offerings can facilitate deployment of application workloads without the cost and complexity of buying and managing the underlying hardware and software and provisioning hosting capabilities, providing the facilities to support the complete life cycle of building and delivering application workloads and services entirely available from the Internet.

BRIEF DESCRIPTION OF THE DRAWINGS

The present disclosure is illustrated by way of example, and not by way of limitation, and can be more fully understood with reference to the following detailed description when considered in connection with the figures in which.

disclosure.

Figure 3A:
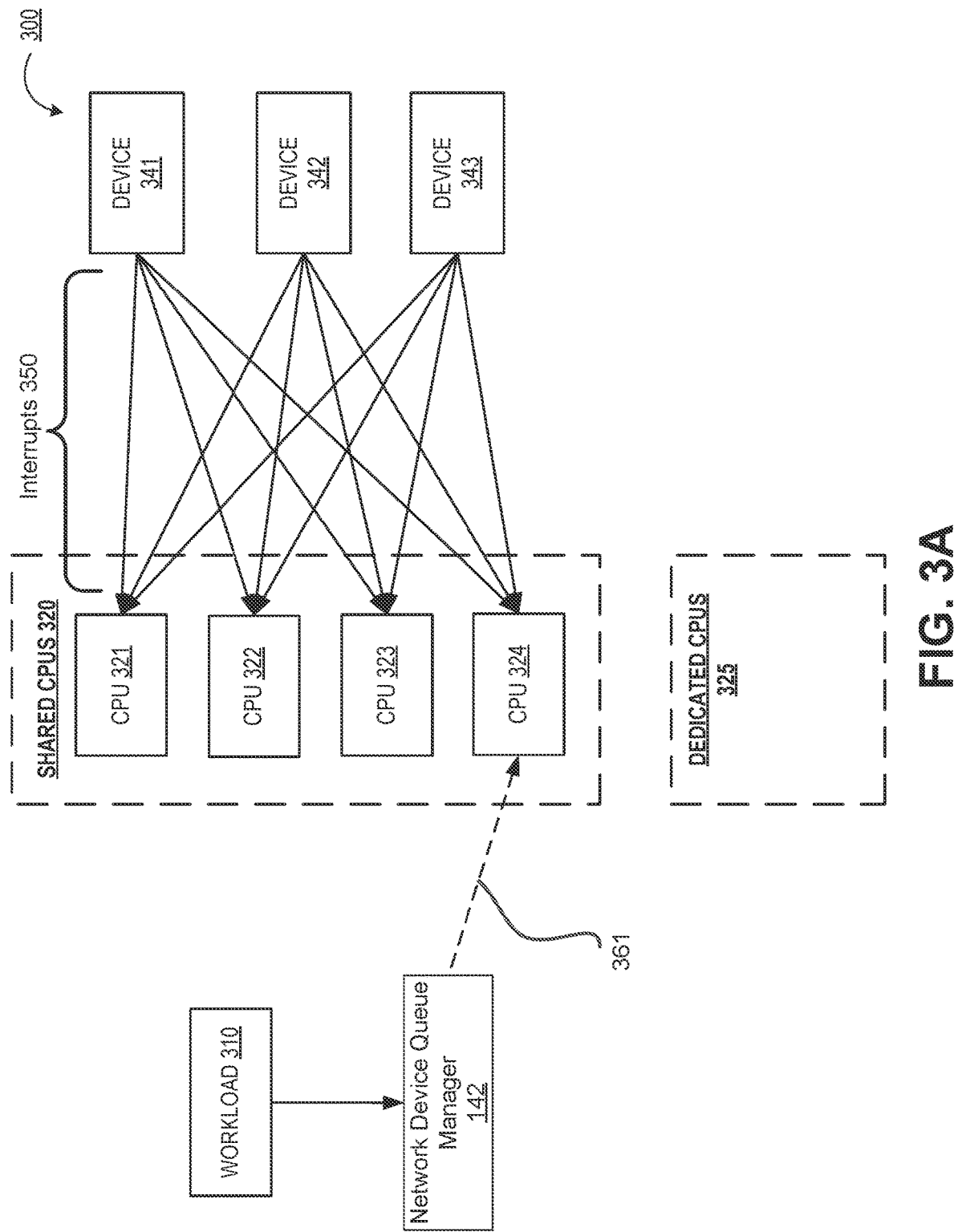
FIG. 3A illustrates an example of selecting a shared CPU to be converted to a dedicated CPU for executing a workload on a node of a cloud computing environment, in accordance with one or more aspects of the present disclosure.
Figure 4:
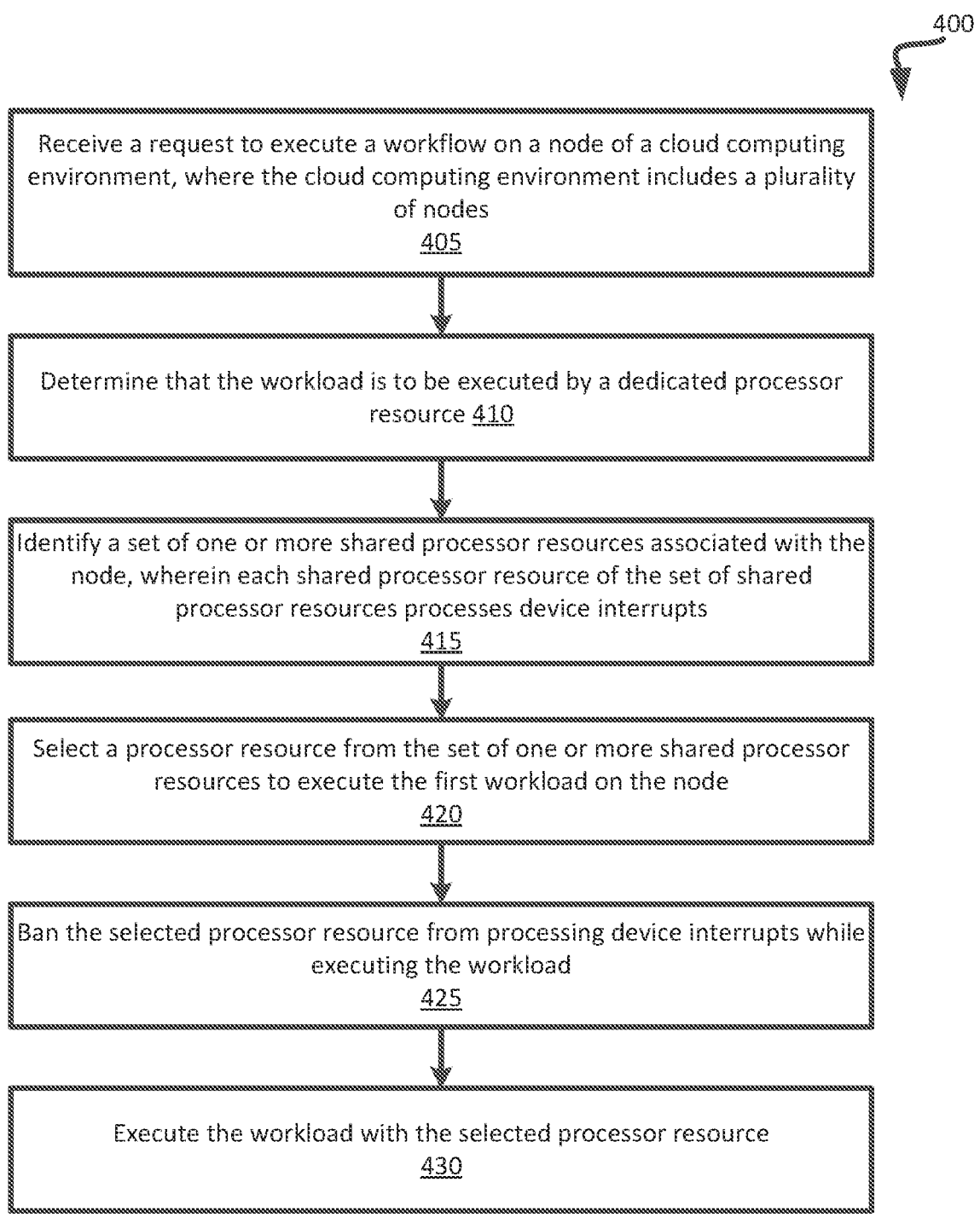

FIG. 3C illustrates an example of converting a dedicated CPU back to a shared CPU on a node of a cloud computing environment, in accordance with one or more aspects of the present disclosure FIG. 4 depicts a flow diagram of a method for facilitating optimized network device queue management for hybrid cloud networking workloads in a cloud computing environment, in accordance with one or more aspects of the present disclosure.

Figure 5:
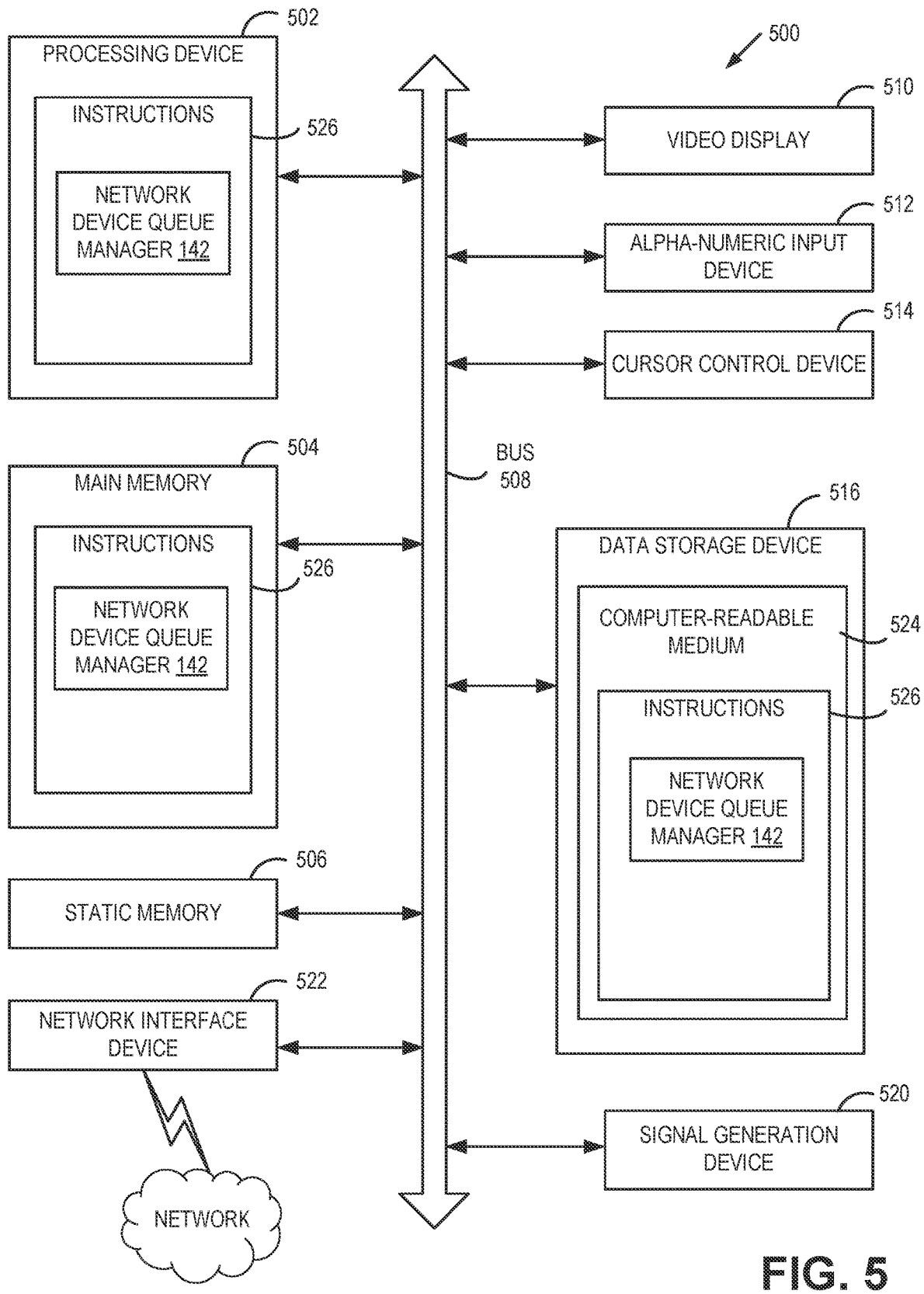

FIG. 5 depicts a block diagram of an illustrative computer system operating in accordance with one or more aspects of the present disclosure.

DETAILED DESCRIPTION

Described herein are methods and systems for optimizing network device queue management for workloads in a cloud computing environment. Cloud computing environments provide many advantages over locally owned computing systems. For example, cloud computing environments can optimize resources by sharing them across multiple users and multiple clients, thereby reducing costs otherwise dedicated to procuring and maintaining local hardware. Additionally, cloud computing environments provide improved scalability for clients. Instead of purchasing additional local computing resources, supporting more data storage and buying more software licenses to support growth in the business, users can rent more storage space, acquire more bandwidth and increase access to software programs which are controlled by a cloud computing provider. Moreover, cloud computing environments can include multiple nodes that can be provisioned to receive and execute executable workloads.

Each node in a cloud computing environment can be provisioned such that its processor resources (e.g., CPU resources) can be configured either to process or to ban device interrupts issued by the devices associated with that node, depending on the processing requirements for executable workloads. CPUs of a particular node can be configured as a "shared" processor resource (also referred to as "reserved" processor resources or CPUs) that can process executable workloads, operating system (OS) operations, device interrupts from hardware devices, or the like. Thus, executable workloads that are executed by shared CPUs can be interrupted if a higher priority OS task or device interrupt is issued to that CPU. Additionally, some CPUs of a node can be configured as "dedicated" processor resources (also referred to as "isolated" or "guaranteed" processor resources) that do not process device interrupts or OS tasks while executing a workload. This type of CPU provisioning can be utilized by workloads that request 100% CPU utilization without being interrupted by other tasks (e.g., OS or device interrupts). For example, some workloads can implement "user-level networking" functionality, which incorporates any needed networking operations within the user space of the workload, thus eliminating the need for system networking resources that would cause networking device interrupts. Workloads that are to be executed by dedicated CPUs can be referred to as "user-level", "guaranteed", "dedicated", etc. workloads.

Cloud computing environments configured in this way, however, can present challenges with the management of processor resources executable workloads. Conventional systems often partition the CPUs of each node into static pools (e.g., non-modifiable groups)—one pool for shared CPUs and another pool for dedicated CPUs. Nodes configured in this way can provide the ability to handle guaranteed workloads, while at the same time provide the shared resources needed to handle OS and device interrupt related tasks. This, however, can result in reduced efficiency in environments with a large number of connected devices. If a node is configured with too few shared processor resources, the shared pool can be insufficient to handle the interrupt traffic produced by the node's devices during periods of heavy activity.

Some conventional cloud computing environments attempt to mitigate the risk of cascading disruptions by increasing the number of shared CPUs that are reserved for processing OS tasks and device interrupts. While this can mitigate problems with overloading interrupt handlers, this can lead to significant inefficiencies with respect to periods of lower interrupt activity. If a node is configured with too many shared processor resources that cannot be utilized for guaranteed workloads, periods of lower activity can result in shared resources remaining idle, wasting valuable processing power that could otherwise be used to execute guaranteed workloads.

Aspects of the present disclosure address the above noted and other deficiencies by implementing a network device queue manager (e.g., as a computer program or a computer program component) to facilitate optimized network device queue management for workloads in a cloud computing environment. The processor resources of a node can be initially configured as a single pool of shared CPUs. The network device queue manager can subsequently dynamically reconfigure CPUs from shared CPUs to dedicated CPUs based on received requests to execute guaranteed workloads. When a request is received to execute a workload that is to be executed by a dedicated CPU, the network device queue manager can identify an available shared CPU, and ban that CPU from processing device interrupts while the requested workload is executing. The network device queue manager can facilitate this by updating the pool of shared CPUs to exclude the CPU selected to execute the requested workload and reconfiguring each device associated with the node to send interrupts only to the updated pool of shared resources. Subsequently, the devices for that node should not send interrupts to the newly designated dedicated CPU.

Aspects of the present disclosure present advantages over conventional solutions to the issues noted above. First, the network device queue manager of the present disclosure is capable of dynamically managing the processor resource needs of all workloads for a node without the limitations of conventional static partitioning. By converting a CPU (or group of CPUs) from a shared resource to a dedicated resource to execute a particular workload and subsequently returning it back to the pool of shared resources, the network device queue manager can significantly improve the efficiency of processor resource utilization for the entire node. Additionally, eliminating the need for static processor partitioning can provide the ability for a cloud service provider to support hybrid networking workloads (e.g., supporting both user-level networking as well as kernel/OS networking) in the same cluster node. This, in turn can significantly improve the efficiency and cost-effectiveness of provisioned hardware resources both on particular nodes as well as across the cloud computing system overall.

Figure 1:
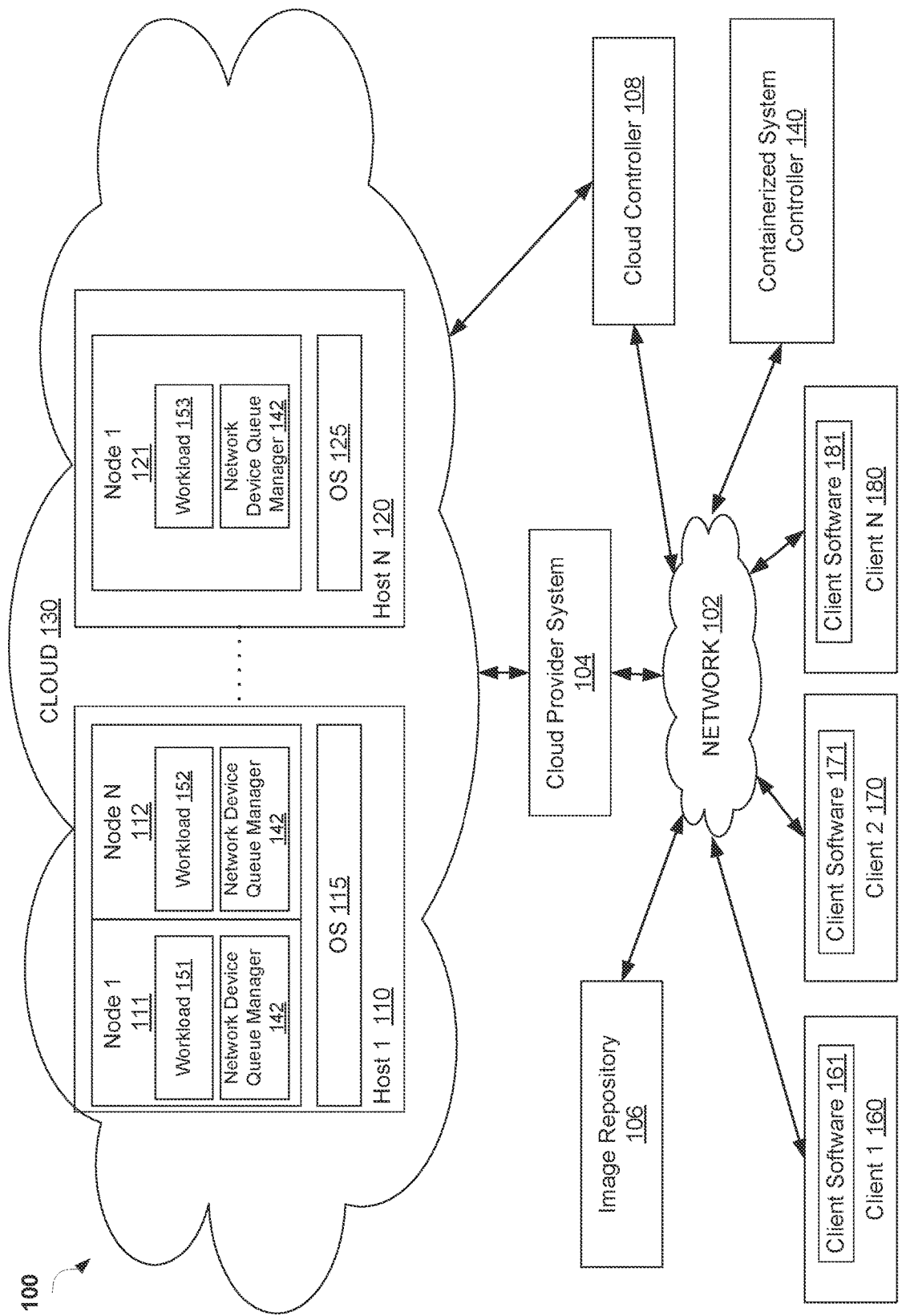
FIG. 1 depicts a high-level component diagram of an example computer system architecture, in accordance with one or more aspects of the present disclosure.

FIG. 1 is a block diagram of a network architecture 100 in which implementations of the disclosure may operate. In some implementations, the network architecture 100 may be used in a containerized computing services platform. A containerized computing services platform may include a Platform-as-a-Service (PaaS) system, such as OpenShift® or Kubernetes®. The PaaS system provides resources and services (e.g., micro-services) for the development and execution of applications owned or managed by multiple users. A PaaS system provides a platform and environment that allow users to build applications and services in a clustered compute environment (the "cloud") Although implementations of the disclosure are described in accordance with a certain type of system, this should not be considered as limiting the scope or usefulness of the features of the disclosure. For example, the features and techniques described herein can be used with other types of multi-tenant systems and/or containerized computing services platforms.

As shown in FIG. 1, the network architecture 100 includes a cloud-computing environment 130 (also referred to herein as a cloud) that includes nodes 111, 112, 121 to execute applications and/or processes associated with the applications. A "node" providing computing functionality may provide the execution environment for an application of the PaaS system. In some implementations, the "node" may refer to a virtual machine (VM) that is hosted on a physical machine, such as host 1 110 through host N 120, implemented as part of the cloud 130. For example, nodes 111 and 112 are hosted on physical machine of host 1 110 in cloud 130 provided by cloud provider 104. In some implementations, an environment other than a VM may be used to execute functionality of the PaaS applications. When nodes 111, 112, 121 are implemented as VMs, they may be executed by operating systems (OSs) 115, 125 on each host machine 110, 120.

In some implementations, the host machines 110, 120 are often located in a data center. Users can interact with applications executing on the cloud-based nodes 111, 112, 121 using client computer systems, such as clients 160, 170 and 180, via corresponding client software 161, 171 and 181. Client software 161, 171, 181 may include an application such as a web browser. In other implementations, the applications may be hosted directly on hosts 1 through N 110, 120 without the use of VMs (e.g., a "bare metal" implementation), and in such an implementation, the hosts themselves are referred to as "nodes".

Clients 160, 170, and 180 are connected to hosts 110, 120 in cloud 130 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, a tablet computing device, a server device, or any other computing device. Each host 110, 120 may be a server computer system, a desktop computer or any other computing device. The cloud provider system 104 may include one or more machines such as server computers, desktop computers, etc.

In various implementations, developers, owners, and/or system administrators of the applications may maintain applications executing in cloud 130 by providing software development services, system administration services, or other related types of configuration services for associated nodes in cloud 130. This can be accomplished by accessing cloud 130 using an application programmer interface (API) within the applicable cloud service provider system 104. In some implementations, a developer, owner, or system administrator may access the cloud service provider system 104 from a client device (e.g., clients 160, 170, and 180) that includes dedicated software to interact with various cloud components. Additionally, or alternatively, the cloud service provider system 104 may be accessed using a web-based or cloud-based application that executes on a separate computing device that communicates with a client device via network 102.

In one implementation, the cloud provider system 104 is coupled to a cloud controller 108 via the network 102. The cloud controller 108 may reside on one or more machines (e.g., server computers, desktop computers, etc.) and may manage the execution of applications in the cloud 130. In some implementations, cloud controller 108 receives commands from containerized system controller 140. In view of these commands, the cloud controller 108 provides data (e.g., such as pre-generated images) associated with different applications to the cloud provider system 104. In some implementations, the data may be provided to the cloud provider 104 and stored in an image repository 106, in an image repository (not shown) located on each host 110, 120, or in an image repository (not shown) located on each node 111, 112, 121. This data may be used for the execution of applications for a containerized computing services platform managed by the containerized system controller 140.

In various implementations, the data can be used for execution of one or more executable workloads 151, 152, 153. In various implementations, a workload 151, 152, 153 can be a pod, a container, a standalone application to be executed in a pod, container, or virtual machine (VM), a VM that itself hosts one or more applications, a container process that itself hosts one or more applications or VMs, or any other entity or executable component that can be scheduled by the cloud computing system scheduler in cloud controller 108 or containerized system controller 140.

In some implementations, the pods can be a group of one or more containers that are deployed together on the same node 111, 112, 121, and are the smallest compute unit that can be defined, deployed, and managed in the containerized computing service environment. Each pod is allocated its own internal IP address, with containers within pods being able to share local storage and networking. Pods can have a lifecycle that is defined and can run on a node 111, 112, 121 until the pod's containers exit or they are removed for some other reason.

Containers can include application images built from pre-existing application components and source code of users managing the application. An image may refer to data representing executables and files of the application used to deploy functionality for a runtime instance of the application. In some implementations, the application images can be built using various types of containerization technologies (e.g., Docker™). An image build system (not pictured) can generate an application image for an application by combining a preexisting ready-to-run application image corresponding to core functional components of the application (e.g., a web framework, database, etc.) with source code specific to the application provided by the user. The resulting application image may be pushed to image repository 106 for subsequent use in launching instances of the application images for execution in the PaaS system.

In various implementations, a container can be a secure process space on the nodes 111, 112, 121 to execute functionality of an application. In some implementations, a container is established at the nodes 111, 112, 121 and 122 with access to certain resources of the underlying node, including memory and storage. In one implementation, the containers may be established using the Linux Containers (LXC) method. In further implementations, containers may also be established using cgroups, SELinux™, and kernel namespaces, to name a few examples.

In some implementations, each node 111, 112, 121 can include a network device queue manager 142 to optimize the network device queue management associated with the applicable node. Network device queue manager 142 can configure the attributes of its associated node 111, 112, 121 such that each processor resource (e.g., processor, CPU, etc.) for that node is initially configured as a shared processor resource. A shared processor resource is a processor, CPU, etc. associated with the node that can process both executable workloads as well as device interrupts, operating system functions, etc. Thus, a shared processor resource is a non-dedicated resource that is interruptible by higher priority tasks.

When a request is received to execute a workload 151, 152, 153 that is to be executed by a dedicated processor resource, network device queue manager can convert one or more of the node's shared processor resources to a dedicated processor resource for executing that workload. A dedicated processor resource is a processor, CPU, etc. associated with the node that is dedicated to executing an executable workload without interruption. Thus, a dedicated processor resource should not be interrupted by operating system tasks, device interrupts, etc. Dedicated processor resources can also be referred to herein as "isolated" processor resources/processors/CPUs, etc., or "guaranteed" "processor resources/processors/CPUs, etc.

Network device queue manager 142 can receive a request to execute a workload in cloud 130. In some implementations, the request may be received from one of clients 160, 170, 180. Alternatively, the request may be received from a scheduling component of the cloud controller 108 or containerized system controller 140. The request may be associated with a new workload to be executed within cloud 130. Alternatively, the request may be responsive to identifying a currently executing workload that may be selected for migration to another node.

As will be discussed in further detail below, network device queue manager 142 can determine whether the requested workload is to be executed by a dedicated processing resource (e.g., a dedicated CPU) that does not process device interrupts. As described in further detail below, workloads that are to be executed by dedicated CPUs can be referred to as "dedicated" workloads (e.g., workloads that need "dedicated" CPUs), "user-level" workloads (e.g., workloads that provide their own networking capabilities, and thus do not make use of operating system networking resources), "guaranteed" workloads (e.g., workloads that need guaranteed uninterrupted CPU utilization), or the like. If network device queue manager 142 determines that the requested workload is to be executed by a dedicated CPU, network device queue manager 142 can identify the pool of shared processor resources (e.g., shared CPUs) associated with the node that are configured to process device interrupts, and select one or more shared processor resources (depending on the needs of the requested workload) to executed the requested workload.

Once a shared processor resource has been selected from the node's pool of processor resources, network device queue manager 142 can ban the selected processor resource from processing device interrupts while executing the requested workload. As described in further detail below, the "banning" process can convert the selected shared processor resource(s) to dedicated processor resource(s) for the duration of the execution of the selected workflow. In various implementations, network device queue manager 142 can complete this process by reconfiguring all devices for that node to send interrupts only to those processor resources in the pool of shared processor resources. Thus, the devices on that node should not send any interrupts to the dedicated CPUs that have been allocated for executing the "user-level", "guaranteed", etc. workloads. Network device queue manager 142 can subsequently execute the requested workload on the converted dedicated processor(s).

When the workload completes execution, network device queue manager 142 can reverse the process by converting the any dedicated CPUs used by that workload back to shared CPUs. Network device queue manager 142 can return those CPUs to the pool of shared CPUs and reconfigure the devices associated with the node to resume sending device interrupts to those CPUs. In some implementations, when another workload has been staged for execution that has requested a dedicated CPU, this reconversion process can be bypassed to save processing resources. Thus, a dedicated CPU can be provisioned to a new workload that has requested a dedicated CPU without first returning it to the pool of shared CPUs.

While aspects of the present disclosure describe the network device queue manager 142 as implemented in a PaaS environment, it should be noted that in other implementations, the security profile manager can also be implemented in an Infrastructure-as-a-Service (Iaas) environment, such as such as Red Hat OpenStack®. Additionally, while for simplicity of illustration, FIG. 1 depicts a single cloud 130, aspects of the present disclosure can be implemented to manage workloads across multiple clouds 130. In such instances the network device queue manager 142 can manage device queues within hybrid cloud environments, multi-cluster cloud environments, or the like. Network device queue manager 142 is described in further detail below with respect to FIGS. 2-4.

Figure 2:
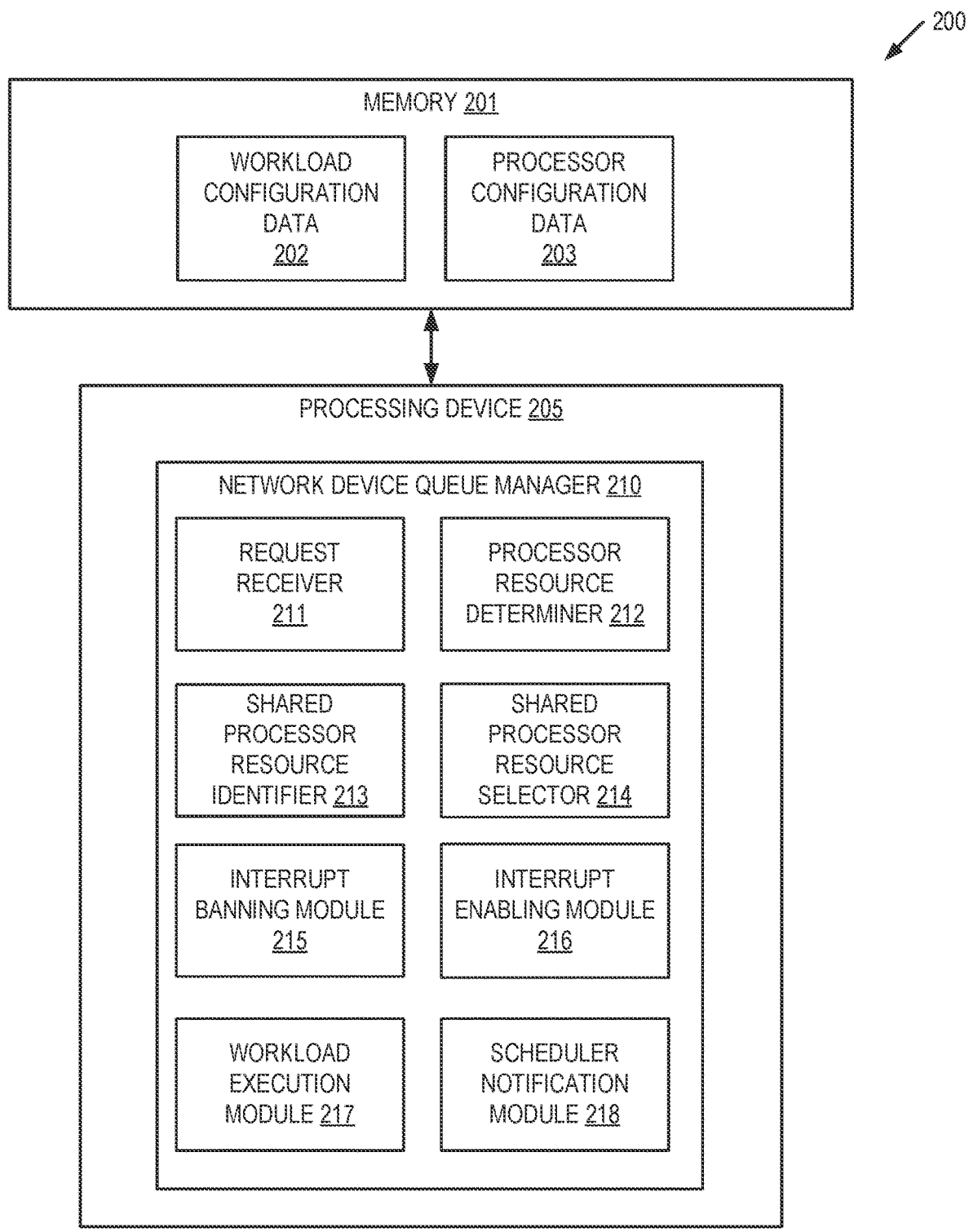
FIG. 2 depicts a block diagram illustrating an example of a network device queue manager for facilitating optimized network device queue management for hybrid cloud networking workloads in a cloud computing environment, in accordance with one or more aspects of the present disclosure.

FIG. 2 depicts a block diagram illustrating an example of a network device queue manager 210 for facilitating optimized network device queue management for hybrid cloud networking workloads in a cloud computing environment. In some implementations, network device queue manager 210 may correspond to network device queue manager 142 of FIG. 1. As shown in FIG. 2, network device queue manager 210 may be a component of a computing apparatus 200 that includes a processing device 205, operatively coupled to a memory 201, to execute workload resource manager 210. In some implementations, processing device 205 and memory 201 may correspond to processing device 502 and main memory 504 respectively as described below with respect to FIG. 5.

Network device queue manager 210 may include request receiver 211, processor resource determiner 212, shared processor resource identifier 213, shared processor resource selector 214, interrupt banning module 215, interrupt enabling module 216, workload execution module 217, and scheduler notification module 218. Alternatively, the functionality of one or more of request receiver 211, processor resource determiner 212, shared processor resource identifier 213, shared processor resource selector 214, interrupt banning module 215, interrupt enabling module 216, workload execution module 217, and scheduler notification module 218 may be combined into a single module or divided into multiple sub-modules.

Request receiver 211 is responsible for receiving a request to execute a workload on a node of a cloud computing environment. As noted above, in some implementations, the cloud computing environment can include multiple nodes, where nodes can include pods, and/or containers that can be used to execute a process (or processes) within the environment. In various implementations, the workload process can be a pod, a container, a standalone application to be executed in a container, pod, or virtual machine (VM), a virtual machine that itself hosts one or more applications, a container process that itself hosts one or more applications or VMs, or any other entity or component that can be scheduled by the cloud computing system scheduler. Cloud computing environments configured in such a manner can be an OpenShift® based environment, a Kubernetes® based environment, or the like. In some implementations, the cloud computing environment can be a hybrid cloud or multi-cluster cloud environment made up of multiple clouds of the same or different cloud providers (e.g., one cloud may be an OpenShift® cloud, a second cloud could be a Kubernetes® cloud, a third cloud could be an Amazon Web Services® (AWS) cloud, etc.).

In various implementations, request receiver module 211 can receive the request to execute the workload from a client device (e.g., client devices 160, 170, 180 of FIG. 1). The request may be received from a developer or system administrator of the cloud computing environment to execute an application process. Alternatively, the request may be received from an end user accessing a cloud computing service provided by the environment. In other implementations, the request can be received from a scheduler component of the cloud computing environment (e.g., a component of cloud controller 108 or containerized system controller 140 of FIG. 1) to execute a workload on a particular node.

In some implementations, request receiver module 211 can receive additional preference information associated with the workload process to be used in selecting a processor resource on the node to execute the workload. In some implementations, the request can specify that the associated workload is a "user-level", "guaranteed" workload that is to be executed by a CPU that will not handle device interrupts (e.g., an "isolated", "dedicated", or "guaranteed" CPU). In other implementations, the request can include configuration information associated with the requested workload that indicates that the workload is to be executed by a dedicated processor resource. For example, the request can include configuration information that indicates that the requested workload will perform its own networking and should not be interrupted by device interrupts. In instances where configuration information is received with the request, this information can be stored for later use by other components of network device queue manager 210 (e.g., as workload configuration data 202).

Processor resource determiner 212 is responsible for determining whether the workload associated with the received request is to be executed by a dedicated processor resource that does not process device interrupts (e.g., an "isolated", "dedicated", or "guaranteed" CPU). In some implementations, processor resource determiner 212 can make this determination in view of information received with the request. For example, as noted above, the request can specify whether the workload is to be executed by a dedicated processor resource. Alternatively, processor resource determiner 212 can make this determination using configuration information associated with the requested workload (e.g., workload configuration data 202). In some implementations, responsive to determining that the workload is to be executed by a dedicated processor resource, processor resource determiner 212 can add an annotation (e.g., a flag, attribute, etc.) to the workload configuration associated with the workload to indicate this determination. For example, processor resource determiner 212 can add configuration data to workload configuration data 202 associated with the requested workload to indicate that the workload is a "user-level" or "guaranteed" workload that is to be executed by a CPU that does not process device interrupts.

Shared processor resource identifier 213 is responsible for identifying a set shared processor resources associated with the node. In various implementations, each shared processor resource of the set of shared processor resources can process device interrupts. In other words, none of the shared processor resources (e.g., none of the "non-isolated" CPUs) has been allocated to a "user-level" or "guaranteed" workload. In some implementations, shared processor resource identifier 213 can identify all shared processor resources for a node, whether they are associated with scheduled tasks or not. In other instances, shared processor resource identifier 213 can identify those shared processor resources that have not been scheduled to perform any other tasks (e.g., those that are idle and/or not associated with a scheduled task).

In some implementations, shared processor resource identifier 213 can make its determinations in view of a minimum number of processor resources needed by the node to provide operational effectiveness. In other words, in determining whether there are any available processing resources on the node to allocate to a workload in need of dedicated processor resources, shared processor resource identifier 213 can use as a factor the number of processors that should remain shared resources (e.g., and not assigned to workloads that need dedicated processor resources). In such instances, shared processor resource identifier 213 can determine the number of shared processor resources in the group of identified shared processor resources. Subsequently, shared processor resource identifier 213 can determine if the number of shared processor resources satisfies a low threshold number. For example, if the node should have at least three shared processors to handle device interrupts and operating system operations for that node, the threshold could be set to three. If the number of available shared processor resources for that node falls to three, then this would satisfy the low threshold value.

Responsive to determining that the number of shared processor resources satisfies the low threshold number, shared processor resource identifier 213 can send an indication to a scheduler component of the cloud computing environment to cause that component to reschedule the workload on a different node in the cloud computing environment that has additional processing resources to allocate to the workload. To continue the above example, if the threshold is set to three processor resources, and the current number in the identified group falls to three, shared processor resource identifier 213 can invoke scheduler notification module 218 to notify the scheduler for the cloud computing environment to reschedule the workload on a different node.

Shared processor resource selector 214 is responsible for selecting a processor resource from the set of shared processor resources on that node to execute the first workload. In some implementations, shared processor resource selector 214 can make this selection randomly (or pseudo-randomly). Alternatively, shared processor resource selector 214 can make the selection in a round robin fashion based on the number of processors associated with the node. In other implementations, shared processor resource selector 214 can select a processor resource that has not been recently selected to execute a workload needing a dedicated processing resource (e.g., another "user-level", or "guaranteed" workload). In other implementations, shared processor resource selector 214 can select a processor resource that has recently been selected to execute a "user-level" or "guaranteed" workload. In these latter instances, some components of network device queue manager 210 can be bypassed as will be discussed below (e.g., interrupt banning module 215).

In some implementations, once a processor resource (or multiple processor resources) has been selected to execute the requested workload, shared processor resource selector 214 can add an annotation to configuration data associated with the node's processors (e.g., processor configuration data 203) that indicates whether each processor is assigned to a "user-level" or "guaranteed" workload. For example, processors that have been assigned to such workloads can be designated as "isolated", "dedicated", "guaranteed", or the like. Similarly, processors that remain shared processor resources can be designated as "non-isolated", "non-dedicated", "non-guaranteed", "shared", or the like. As shared processor resource selector 214 makes its selection(s), it can additionally update configuration data that tracks the number of processors in each category. This number can be used by subsequent executions of shared processor resource identifier 214 to determine whether the number of available shared processor resources meets any low threshold number as described above.

Interrupt banning module 215 is responsible for banning the selected processor resource from processing device interrupts while executing the workload. As noted above, "banning" refers to the process of systematically preventing a shared processing resource from processing device interrupts issued by any device associated with the node. In various implementations, interrupt banning module 215 can ban the selected processor from processing device interrupts by converting that selected processor resource to a dedicated processor resource while executing the received workload.

In some implementations, interrupt banning module 215 can perform this operation by removing from the set of shared processors the processor selected by shared processor resource selector 214. In some instances, interrupt banning module 215 can modify the appropriate counters that track the number of shared processors in the pool of shared processing resources as well as the number of dedicated processors that have been assigned "user-level" or "guaranteed" workloads. Subsequently, interrupt banning module 215 can then identify the devices associated with the node and reconfigure each of them to send interrupts only to the updated set of shared processor resources and not to any of the dedicated processor resources (e.g., the processors that are not in the set of shared processor resources).

In various implementations, when a node is initiated in a cloud computing environment, the initiation process configures the interrupt queues for each device to direct that device to the particular processor to which it can send interrupts. In such instances interrupt banning module 215 can re-execute that process to perform the device reconfiguration each time a processor resource is converted from a shared processor to a dedicated processor. Similarly, as described below, that process can be re-executed to reconfigure the devices each time a processor resource is converted from a dedicated processor back to a shared processor. In some implementations, as a part of the re-configuration process, interrupt banning module 215 can set the interrupt queue count for each device associated with the node to the total number of processor resources in the node minus the number of dedicated processor resources. Thus, the interrupt queue count for each device should represent the total number of shared processor resources that can process device interrupts.

As noted above, in some implementations, a subsequently received request to execute another workload using a dedicated processor resource can be assigned a dedicated processor that has recently completed executing a previously received "user-level" workload. In such instances, rather than identify a shared resource that is to be converted to a dedicated resource, network device queue manager can re-provision the dedicated processor resource to the newly received workload. In such instances, interrupt banning module 215 can be bypassed since the processor has already been converted to a dedicated processor, thus eliminating the need for reconfiguring the devices to exclude it from receiving device interrupts.

Workload execution module 217 is responsible for executing the workload using the assigned dedicated processor resource(s). Once the workload has completed execution, workload execution module 217 can invoke interrupt enabling module 216 to convert the dedicated processor resource back to a shared processor resource. In some implementations, as noted above, the dedicated processor resource assigned to that workload can be allocated to a newly received workload that is to be executed by a dedicated processor resource. In these instances, both interrupt enabling module 216 as well as interrupt banning module 215 can be bypassed since the processor has already been converted to a dedicated processor, so two device reconfiguration cycles can be eliminated to reduce additional processing costs.

Interrupt enabling module 216 is responsible for converting the dedicated processor resource back to a shared processor resource that can process device interrupts. In various implementations, interrupt enabling module 216 can be invoked responsive to determining that a workload has completed executing. Alternatively, interrupt enabling module 216 can be invoked if the applicable dedicated processor has not be reassigned to another workload, thus eliminating the present need to re-enable interrupts for that processor.

In instances where the dedicated processor is to be reconverted back to a shared processor, interrupt enabling module 216 can update the processor configuration data 203 to remove the applicable processor(s) to from the set of dedicated processors and add the applicable processor(s) to the set of shared processor resources. Similarly, interrupt enabling module 216 can determine the number of processor resources that are to be reconverted, adding that number to the total number of shared processor resources, and subtracting that number from the total number of dedicated processor resources. Subsequently, interrupt enabling module 216 can perform the device reconfiguration process described above to configure each of the node's devices to send interrupts only to the newly updated set of shared processor resources.

Scheduler notification module 218 is responsible for notifying the scheduler for the cloud computing environment to reschedule a workload on a different node. As noted above, scheduler notification module 218 can be invoked by shared processor resource identifier 213 to cause a requested workload to be scheduled on a different node if the currently selected node does not have the available processor resources to allow for converting a shared processor resource to a dedicated processor resource to satisfy the request.

Figure 3B:
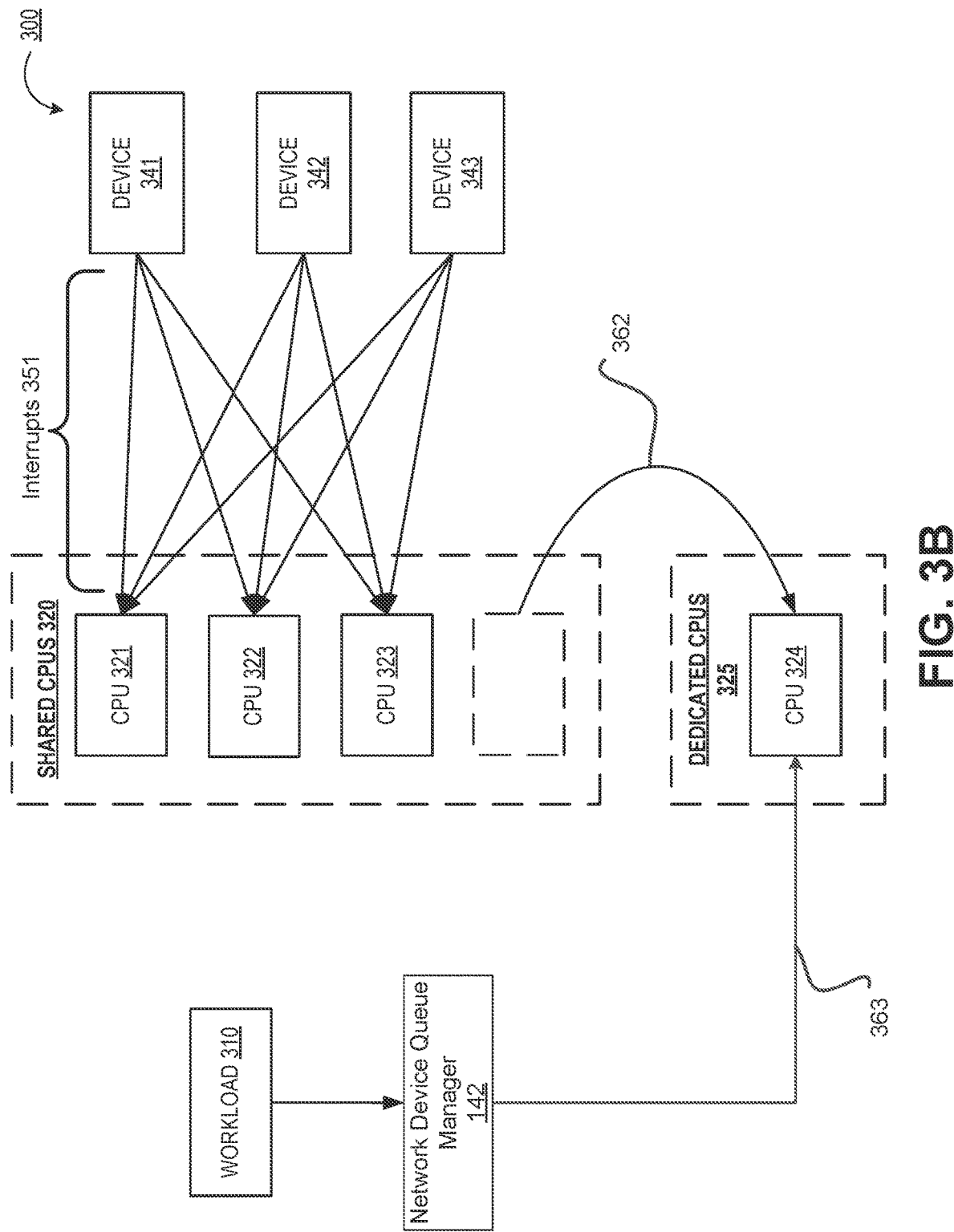
FIG. 3B illustrates an example of converting a shared CPU to a dedicated CPU for executing a workload on a node of a cloud computing environment, in accordance with one or more aspects of the present disclosure.

FIGS. 3A-3C illustrate an example of optimized network device queue management for hybrid cloud networking workloads on a node 300 of a cloud computing environment. As shown in FIG. 3A, a network device queue manager 142 receives a request to execute workload 310 on node 300. As described above with respect to FIG. 2, network device queue manager 142 can determine that workload 310 is a "guaranteed" or "user-level" workload that is to be executed by a "dedicated" or "isolated" CPU that does not process device interrupts. Also as described above, network device queue manager 142 can identify a set of shared processor resources associated with node 300 (e.g., shared CPUs 320), where each of those processor resources processes device interrupts. As shown, devices 341, 342, 343 are hardware devices (e.g., networking devices, etc.) associated with node 300 that are each configured to send interrupts (depicted by interrupts 350) to all CPUs (CPUs 321-324) in the group of shared CPUs 320.

Subsequently, network device queue manager 142 can select one (or more) of the shared CPUs 320 to execute workload 310. As shown by operation 361 of FIG. 3A, network device queue manager 142 can select shared CPU 324 to execute workload 310 since there are no available dedicated CPUs already provisioned for that node to ban device interrupts.

As shown in FIG. 3B, network device queue manager 142 can ban CPU 324 from processing device interrupts issued by devices 341, 342, 343 by dynamically converting CPU 324 from a shared CPU to a dedicated CPU. Network device queue manager 142 can remove CPU 324 from the set of shared CPUs 320 and add it to the set of dedicated CPUs 325 (illustrated by operation 362). Additionally, network device queue manager 142 can reconfigure each of devices 341, 342, 343 to modify the interrupt queues such that the devices send device interrupts to the modified group of shared CPUs 320 (e.g., CPUs 321, 323, 323) and not to CPU 324 (illustrated by the updated interrupts 351). Subsequently, network device queue manager 142 can initiate execution of workload 310 using the selected CPU 324.

As shown in FIG. 3C, network device queue manager 142 return the selected CPU from the dedicated CPU pool back to the shared CPU pool 320 when workload 310 completes execution. As shown, network device queue manager 142 can convert dedicated CPU 324 back to shared CPU 324 by adding CPU 324 back to the pool of shared CPUs 320 (operation 364). Network device queue manager 142 can additionally identify the devices for node 300 and again reconfigure each of devices 341, 342, 343 to modify the interrupt queues such that the devices send device interrupts to the modified group of shared CPUs 320 (e.g., CPUs 321, 322, 322, and again 324), which is illustrated by the updated interrupts 352). The above process can be repeated for any additional workloads received by network device queue manager 142 that are to be executed by a dedicated CPU resource.

It should be noted that while FIGS. 3A-3C illustrate a particular example of network device queue management based on a particular set of CPUs and devices, in other implementations, aspects of the present disclosure can be applied to nodes with more or fewer CPUs and/or devices.

FIG. 4 depicts a flow diagram of an example method 400 for facilitating optimized network device queue management for hybrid cloud networking workloads in a cloud computing environment. The method may be performed by processing logic that may comprise hardware (circuitry, dedicated logic, etc.), computer readable instructions (run on a general purpose computer system or a dedicated machine), or a combination of both. In an illustrative example, method 400 may be performed by network device queue manager 142 in FIG. 1. Alternatively, some or all of method 400 might be performed by another module or machine. It should be noted that blocks depicted in FIG. 4 could be performed simultaneously or in a different order than that depicted.

At block 405, processing logic receives a request to execute a workload on a node of a cloud computing environment, wherein the cloud computing environment comprises a plurality nodes. At block 410, processing logic determines that the workload is to be executed by a processor resource that is dedicated to execute the workload and should not process device interrupts. At block 415, processing logic identifies a set of one or more shared processor resources associated with the node, where each shared processor resource of the set of shared processor resources processes device interrupts. At block 420, processing logic selects a processor resource from the set of one or more shared processor resources to execute the first workload on the first node. At block 425, processing logic bans the selected processor resource from processing device interrupts while executing the workload. At block 430, processing logic executes the workload with the selected processor resource.

FIG. 5 depicts an example computer system 500 which can perform any one or more of the methods described herein. In one example, computer system 500 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while a single computer system is illustrated, the term "computer" shall also be taken to include any collection of computers that individually or jointly execute a set (or multiple sets) of instructions to perform any one or more of the methods discussed herein.

The exemplary computer system 500 includes a processing device 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic (e.g., instructions 526) that includes network device queue manager 142 for performing the operations and steps discussed herein (e.g., corresponding to the method of FIG. 4, etc.).

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker). In one illustrative example, the video display unit 510, the alphanumeric input device 512, and the cursor control device 514 may be combined into a single component or device (e.g., an LCD touch screen).

The data storage device 516 may include a non-transitory computer-readable medium 524 on which may store instructions 526 that include network device queue manager 142 (e.g., corresponding to the method of FIG. 4, etc.) embodying any one or more of the methodologies or functions described herein. Network device queue manager 142 may also reside, completely or at least partially, within the main memory 504 and/or within the processing device 502 during execution thereof by the computer system 500, the main memory 504 and the processing device 502 also constituting computer-readable media. Network device queue manager 142 may further be transmitted or received over a network via the network interface device 522.

While the computer-readable storage medium 524 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that aspects of the present disclosure may be practiced without these specific details. In some instances, well-known structures and devices are shown in block diagram form, rather than in detail, in order to avoid obscuring the present disclosure.

Unless specifically stated otherwise, as apparent from the following discussion, it is appreciated that throughout the description, discussions utilizing terms such as "receiving," "determining," "executing," "identifying," "selecting," "banning", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the specific purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the disclosure presented herein are not inherently related to any particular computer or other apparatus. Various general purpose systems may be used with programs in accordance with the teachings herein, or it may prove convenient to construct more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not have an ordinal meaning according to their numerical designation.

What is claimed is:

1. A method comprising:
   receiving, by a processing device, a request to execute a workload on a node of a cloud computing environment, wherein the node comprises a plurality of processor resources assigned to a pool of shared processor resources that process device interrupts;
   selecting a processor resource from the pool of shared processor resources to execute the workload;
   excluding the selected processor resource from the pool of shared processor resources to prevent device interrupts while executing the workload;
   executing the workload with the selected processor resource;
   responsive to determining that execution of the workload is completed, adding the selected processor resource to the pool of shared processor resources;
   identifying a device associated with the node; and
   configuring the device to send interrupts to the pool of shared processor resources.

2. The method of claim 1, wherein excluding the selected processor resource from the pool of shared processor resources to prevent device interrupts further comprises:
   converting the selected processor resource to a dedicated processor resource dedicated to execute the workload.

3. The method of claim 2, wherein converting the selected processor resource to the dedicated processor resource further comprises:
   generating an updated pool of shared processor resources;
   identifying one or more devices associated with the node; and
   configuring each of the one or more devices to send interrupts to the updated pool of shared processor resources.

4. The method of claim 1, further comprising:
   determining a number of shared processor resources in the pool of shared processor resources;
   determining if the number of shared processor resources satisfies a low threshold number; and
   responsive to determining that the number of shared processor resources satisfies a low threshold number, sending an indication to a scheduler component of the cloud computing environment to cause the scheduling component to reschedule the workload on another node of the cloud computing environment.

5. The method of claim 1, wherein determining that the workload is to be executed by a processing resource dedicated to execute the workload without device interrupts further comprises:
   determining that the request comprises an indication that the workload is to be executed by a dedicated processor resource.

6. The method of claim 1, wherein determining that the workload is to be executed by a processing resource dedicated to execute the workload without device interrupts further comprises:
   determining, in view of configuration attributes associated with the workload, that the workload performs one or more user-level networking operations.

7. A computing apparatus comprising:
   a memory; and
   a processing device, operatively coupled to the memory, to:
   receive a request to execute a workload on a node of a cloud computing environment, wherein the node comprises a plurality of processor resources assigned to a pool of shared processor resources that processes device interrupts;
   identify the pool of shared processor resources;
   exclude at least one processor resource of the pool of shared processor resources to prevent device interrupts while executing the workload;
   execute the workload with the at least one processor resource;
   responsive to determining that execution of the workload is completed, add the at least one processor resource to the pool of shared processor resources;
   identify one or more devices associated with the node; and
   configure each of the one or more devices to send interrupts to the pool of shared processor resources.

8. The computing apparatus of claim 7, wherein to exclude at least one processor resource of the pool of shared processor resources to prevent device interrupts, the processing device is further to:
  convert the at least one processor resource of the pool of shared processor resources to a dedicated processor resource dedicated to execute the workload.

9. The computing apparatus of claim 8, wherein to convert the at least one shared processor resource to the dedicated processor resource, the processing device is further to:
  generate an updated pool of shared processor resources;
  identify one or more devices associated with the node; and
  configure each of the one or more devices to send interrupts to the updated pool of shared processor resources.

10. The computing apparatus of claim 7, wherein the processing device is further to:
  determine a number of shared processor resources in the pool of shared processor resources;
  determine if the number of shared processor resources satisfies a low threshold number; and
  responsive to determining that the number of shared processor resources satisfies a low threshold number, send an indication to a scheduler component of the cloud computing environment to cause the scheduling component to reschedule the workload on another node of the cloud computing environment.

11. A non-transitory computer readable storage medium, having instructions stored therein, which when executed by a processing device of a computer system, cause the processing device to:
  receive a request to execute a workload on a node of a cloud computing environment, wherein the node comprises a plurality of processor resources assigned to a pool of shared processor resources that processes device interrupts;
  identify the pool of shared processor resources;
  exclude at least one processor resource of the pool of shared processor resources to prevent device interrupts while executing the workload;
  execute the workload with the at least one processor resource;
  responsive to determining that execution of the workload is completed, add the at least one processor resource to the pool of shared processor resources;
  identify one or more devices associated with the node; and
  configure each of the one or more devices to send interrupts to the pool of shared processor resources.

12. The non-transitory computer readable storage medium of claim 11, wherein to exclude at least one processor resource of the pool of shared processor resources to prevent device interrupts, the processing device is further to:
  convert the at least one processor resource of the pool of shared processor resources to a dedicated processor resource dedicated to execute the workload.

13. The non-transitory computer readable storage medium of claim 12, wherein to convert the at least one processor resource to the dedicated processor resource, the processing device is further to:
  generate an updated pool of shared processor resources;
  identify one or more devices associated with the node; and
  configure each of the one or more devices to send interrupts to the updated pool of shared processor resources.

14. The non-transitory computer readable storage medium of claim 11, wherein the processing device is further to:
  determine a number of shared processor resources in the pool of shared processor resources;
  determine if the number of shared processor resources satisfies a low threshold number; and
  responsive to determining that the number of shared processor resources satisfies a low threshold number, send an indication to a scheduler component of the cloud computing environment to cause the scheduling component to reschedule the workload on another node of the cloud computing environment.

* * * * *